Nov. 7, 1967  R. MAGLADRY  3,351,534
HYDROGEN DIFFUSION REACTOR CONTROL
Original Filed June 12, 1964
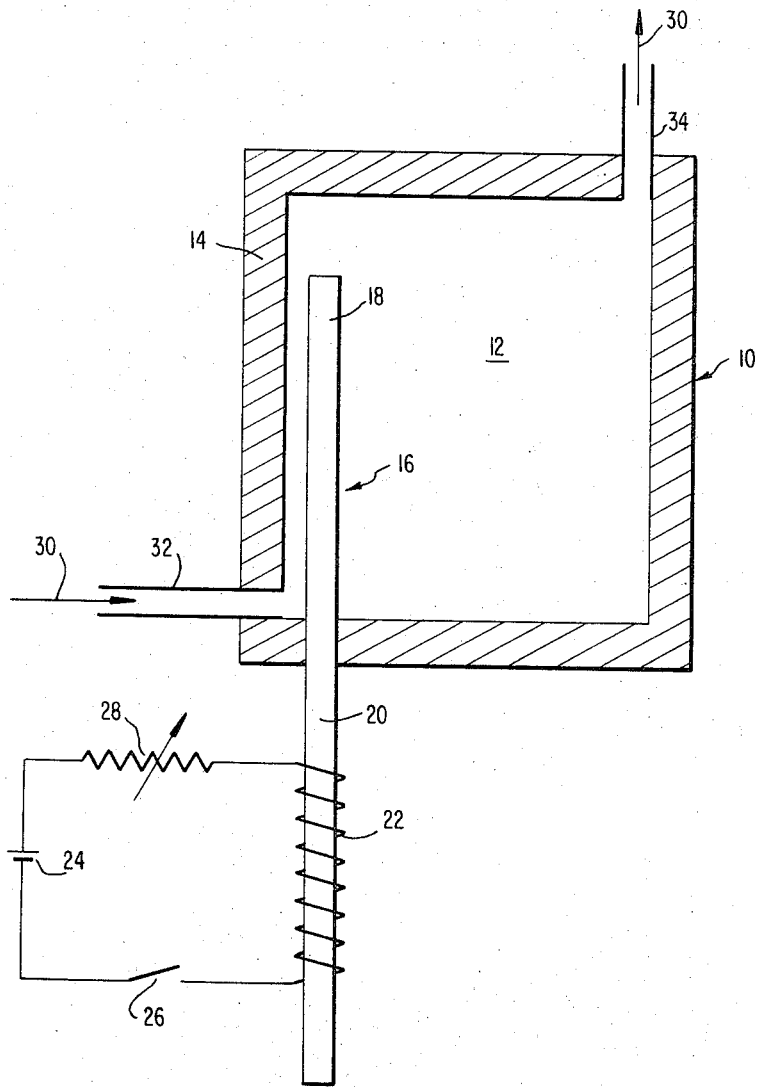
INVENTOR.
ROBERT MAGLADRY
BY
*Sughrue, Rothwell, Mion & Zinn*
ATTORNEYS

United States Patent Office

3,351,534
Patented Nov. 7, 1967

3,351,534
HYDROGEN DIFFUSION REACTOR CONTROL
Robert Magladry, Baltimore, Md., assignor to Martin-Marietta Corporation, New York, N.Y., a corporation of Maryland
Continuation of application Ser. No. 374,656, June 12, 1964. This application Jan. 3, 1966, Ser. No. 520,824
26 Claims. (Cl. 176—42)

This is a continuation of my copending application, Ser. No. 374,656, filed June 12, 1964, and entitled, "Hydrogen-Diffusion Reactor Control," which application is now abandoned.

The present invention relates to nuclear reactors and more particularly to the means for regulating and controlling the nuclear reaction occurring therein comprising a dual function control rod.

The nuclear reaction is controlled in most cases by the insertion or rotation of a regulating or control rod into the composition. This rod can contain a neutron absorbing material which reduces the nuclear reaction rate, fissionable material which increases the reaction rate, or neutron scattering or moderating material which also increases the reaction rate by increasing the probability that neutrons will cause fission before they are lost through non-fission absorption or leakage. Regardless of the nuclear process involved, regulating and controlling of the reaction requires that the control rod be mechanically positioned within the reactive composition. The nuclear reactor is operated with the control rod at or near what is commonly termed the critical position. Displacement of the control rod from this position either will provide a neutron reproduction ratio below unity in which event the neutron density declines or will provide a neutron reproduction ratio above unity in which event the neutron density in the reactor rises. Apart from obtaining a desired neutron density, the return of the control rod to the critical position acts to hold the reaction at the desired level. Since such reactors operate with movable mechanical apparatus to automatically regulate the reactor to the condition of criticality during moderate variations in operating parameters, the reactor must be constantly monitored which, of course, involves some mechanical movements.

In addition to the employment of means for variably positioning the control rod with respect to the reactive composition, the nuclear reaction may also be partially or totally controlled by suitably controlling the movement of fluid to and from the reactive composition of a nuclear reactor. This fluid may also serve as a reactor coolant, but in any case, affects the nuclear reaction by changing the probability of neutron absorption, neutron fission, or neutron scattering. Heretofore, these methods of control have required movable mechanical apparatus and associated sensing means for effecting automatic regulation.

It is, therefore, a primary object of the present invention to provide an improved nuclear reactor employing a completely mechanically passive control system.

It is a further object of this invention to provide a control system of this type which is inherently self-regulating.

It is a further object of this invention to provide an improved nuclear reactor incorporating a control system which is capable of providing three modes of reactor power regulation and/or control involving:

(1) the maintenance of an established power level;
(2) a change in power level to maintain a given coolant temperature; and
(3) independent control over power level.

It is a further object of this invention to provide an improved nuclear reactor having a control system of this type which is compatible with convection cooling of the critical region of the reactor.

Further objects of this invention will be pointed out in the following detailed description and claims and illustrated in the accompanying drawing which discloses, by way of example the principle of this invention and the best mode which has been contemplated of applying that principle.

In the drawing:

The single figure is a schematic view of a nuclear reactor incorporating the improved control system of the present invention.

In general, the present system is directed to a self-regulating, mechanically passive control system for a nuclear reactor having as its main section a reactive composition of region(s) containing fissionable material, that is, reactor fuel, which are commonly termed core and may have within this section region(s) containing non-fissionable material which are commonly termed reflector. The control system incorporates a control rod of hydride material which is fixed with respect to the main reactor section such that one end of the rod is positioned internally within the section and the other end protrudes exteriorly thereof. Fissionable material, that is, reactor fuel, or other material subject to nuclear heating is incorporated within the internal end of the rod and means are provided for producing a temperature differential between the internal and external ends of the rods to vary the hydrogen concentration within respective ends of the rod. More than one control rod may be utilized in the control system. When these control rods contain reactor fuel, they also serve as reactor fuel elements in the conventional sense.

Referring to the drawing, there is shown schematically the nuclear reactor having a main section 10, as is conventional in the art, including suitable core and reflector means, indicated generally by numerals 12 and 14, respectively. The control system of the present invention has broad application to most conventional nuclear reactor systems and employs principally one or more control elements 16 which penetrate either the core or reflector portion of the main reactor section 10 having a portion 18 internally of the reactor and a portion 20 extending exteriorly thereof. The element 16 is formed of hydride material and the control function is broadly achieved by varying the hydrogen concentration within the control element 16 and utilizing the effect upon the reaction occurring within the main section of the nuclear reactor. Specifically, the moderation of the nuclear reaction is increased or decreased according to whether the hydrogen concentration in the main section is high or low. Hydrogen has the highest property, cross-section, for the scattering of neutrons of any known chemical species. Neutron diffusion velocities are considerably reduced by the scattering process and, thereby, the probability of the neutrons leaking from the main section of the reactor is reduced. The nuclear reaction rate is, in turn, dependent upon the retention of neutrons within the reactive composition. Suitable hydride materials, that is, materials which can retain hydrogen within their structure within a conventional nuclear reactor environment, are yttrium, zirconium, silicon, niobium, calcium, and barium. The hydride material can be alloyed or otherwise combined with nuclear fuel material, such as uranium, plutonium and thorium.

In the preferred form, reactor fuel is incorporated in the hydride material and the temperature of the internal section 18 of the element is maintained by the material itself which is susceptible to nuclear heating from the reactor fuel incorporated therein. Thus, the temperature of the internal section is directly dependent upon the reaction occurring therein. It must be appreciated that the rod provides the dual function of controlling reaction and supplying fuel for reaction, the functions heretofore never incorporated in a single element. In contrast, the temperature of the external section 20 of the hydride control element and the temperature differential between the interior section 18 of the element and the external section 20 can be controlled by external heating means. The drawing shows, in schematic form, one method for effecting temperature variation in the external section 20 of the hydride control element. In the illustrative embodiment shown, an electrical resistance heater, indicated at 22, is connected in series with a power source, representatively shown by battery 24 which may be connected and disconnected through switch 26. The current flow from the source or battery 24 is controlled by a simple rheostat 28 which is connected in series between the power source 24 and the resistor 22.

As mentioned previously, the control system resides in the fact that the hydride material provides a variable hydrogen concentration within internal hydride section 18. Change in the temperature of the section 20 of the hydride element, which is exterior to the main reactor section, relative to the temperature of the section 18 of the hydride element, which is within the main reactor section, causes the hydrogen concentration within the main reactor section to either increase or decrease. Thus, the reactivity of the reactor and consequently the reactor power is thereby either maintained or modified (increased or decreased).

The temperature level of the element 16 establishes the solubility of hydrogen in the hydride material. The temperature difference between the two sctions 18 and 20 of the element establishes the rate of hydrogen diffusion between the sections. Heat is released by the hydride material when hydrogen is entering solution and heat is absorbed by the hydride material when hydrogen is leaving solution. Heat is nominally exchanged between the element 16 and the reactor coolant which surrounds the interior section 18 of the hydride element, through convective cooling of the internal section. The flow path is indicated by arrows 30, passing from inlet 32 to outlet 34. It is obvious therefore that the regulation and/or control of the reactor power may be achieved by arranging the required temperatures under the conditions set forth above.

While the invention has been described in extremely simplified terms as applied to a reactor shown only schematically in the drawing, the control system of the present invention may be more readily understood by a brief description of system operation from the standpoint of typical operational changes from the desired norm. For instance, an undesired change from a given power level, for instance, a power increase, causes the temperature of the internal section 18 of the element to increase and thereby causes hydrogen to diffuse from the internal section 18 to the external section 20. The resulting decrease in hydrogen concentration within the internal section of the hydride element causes nuclear reactivity to fall below its critical value and consequently the reactor power to decline. As the internal section temperature declines with the power, the hydrogen diffuses back into it increasing the hydrogen concentration within the internal section of the hydride element 16 until the reactivity is again at its critical value. The given power level is thereby-reestablished. The converse process occurs with an undesirable power decrease from a given level. An increase in hydrogen concentration will occur within the internal section increasing nuclear reactivity tending to effect temperature rise with resultant hydrogen diffusion from the internal to the external section until the given level again is re-established as a result of change in hydrogen concentration.

As mentioned previously, the temperature of the coolant or the relative flow of coolant and heat absorption thereof greatly affects the operation of the reactor. For instance, a change in coolant temperature from a given level, such as a temperature increase due to a reduced coolant flow, causes the temperature of the internal section 18 of the element to increase, thereby causing diffusion of hydrogen from the internal to the external section of the element and as a result of the sequence of events set forth previously, results in a reduced power level such that the coolant temperature is returned to its given level. Conversely, a coolant temperature decrease due to increased coolant flow results in an increased power level which returns the coolant temperature to its given level.

From the above, it is apparent that not only is the system mechanically passive but the system is completely self-regulating.

During startup and shutdown operations, it is desirable to have independent control of reactor power. Such independent control is effected by varying the electrical heating of the external section of the element, thereby creating the desirable temperature differential between the internal section 18 and the external section 20 of the hydride element. By changing the rheostat setting, an increase in electrical power input from battery occurs, which results in increased heating of resistor heater. The solubility of hydrogen in the internal section 18 of the element increases as a result of conduction heating of the internal section by the external section. Hydrogen diffuses from the external section 20 to the internal section 18 increasing the hydrogen concentration in that section and providing an increase in nuclear reactivity. A decrease in electrical power input operates in a converse manner, decreasing the internal hydrogen concentration and causing a decrease in nuclear reactivity. Steady state power levels are reached when the hydrogen concentration as a result of the internal nuclear heating and external electrical heating places reactivity at its critical value.

It is obvious that the simplified control system of the present invention which is highly compatible with simple convection cooling of the critical region of the reactor provides a mechanically passive system which is inherently self-regulating and eliminates the need for control rods, control drums, soluble poisons, etc., normally utilized in the prior art devices.

The power level of the reactor, of course, is partially controlled by the amount of heat removed by the coolant surrounding the internal section 18 of the hydride element. The rate of coolant flow may be varied with the coolant subsequently converted to steam within a heat exchanger (not shown) located either externally or internally of the main reactor section 10. Of course, the steam output may be utilized in a conventional manner, for instance, heating, power production, etc.

It it apparent that in the preferred embodiment shown, a simple, compact nuclear reactor is thus provided which requires no attendance since there are no moving parts, no mechanical control rods and the reactor is inherently self-regulating. While there have been shown and described and pointed out the fundamental novel features of the invention as applied to a preferred embodiment, it will be understood that various omissions and substitutions and changes in the form and detail of the system illustrated and in its operation may be made by those skilled in the art without departing from the spirit of the invention. It is the intention, therefore, to be limited only as indicated by the scope of the following claims.

What is claimed is:

1. A self-regulating, mechanically passive control system for a nuclear reactor having a main reactor section including core and reflector means, said system comprising: a control rod of hydride material, said control rod fixedly positioned with respect to said main reactor section with one end of said rod disposed therein in operative relation to said core and reflector means and the other end extending exteriorly of said core, reactor fuel incorporated within the end of said rod positioned internally of said core and means for producing a temperature differential between said rod ends to thereby vary the hydrogen concentration within respective ends of said rod.

2. The apparatus as claimed in claim 1 wherein said hydride material is a compound selected from the group consisting of yttrium hydride, zirconium hydride, silicon hydride, niobium hydride, calcium hydride, and barium hydride.

3. The apparatus as claimed in claim 1 wherein said reactor fuel incorporated within the end of said rod positioned internally of said core is an element selected from the group consisting of uranium, plutonium, and thorium.

4. The apparatus as claimed in claim 1 wherein said means for producing a temperature differential includes an electrical heating element positioned in proximity to the end of said control rod exterior of said core, means for supplying current to said heating element, and means to control said current flow.

5. The apparatus as claimed in claim 1 wherein said means for producing a temperature differential includes a coolant and means to move said coolant within said reactor core in proximity to the inner end of said control rod whereby heat is absorbed by said coolant through convection.

6. A self-regulating, mechanically passive control system for a nuclear reactor having a main reactor section including core and reflector means, said system comprising: a control rod of hydride material, means for fixedly positioning said control rod with respect to said main reactor section whereby one end of said control rod is disposed therein in operative relation to said core and reflector means and the other end extends exteriorly of said core, reactor fuel incorporated within the inner end of said control rod, means for directing coolant about the inner end of said control rod to absorb heat therefrom by convection, an electrical heating element positioned in proximity to the outer end of said control rod exteriorly of said core, a source of electrical current, means for connecting said source of current to said heating element and means for varying current flow through said heating element whereby a temperature differential is produced between the inner and outer ends of said control rod to vary the hydrogen concentration within respective ends of said rod to regulate nuclear reaction occurring in the critical region of said reactor.

7. An improved nuclear reactor having a main reactor section including core and reflector means, a source of coolant within said main reactor section within the critical region thereof for removing the heat of reaction by convection, the improvement comprising: a control rod of hydride material, said control rod being fixedly positioned with respect to main reactor section with one end of said control rod disposed within said main reactor section in operative relation to said core and reflector means and in contact with said coolant and the other end of said control rod extending exteriorly thereof, reactor fuel incorporated within the internal end of said rod, and means for producing a temperature differential between the internal and external ends to vary the hydrogen concentration within respective ends to provide a self-regulating, mechanically passive control system.

8. The apparatus as claimed in claim 7 wherein said means for producing a temperature differential includes an electrical resistance heater positioned in proximity to said external end of said rod, means for connecting a source of electrical current to said electrical heater and means for varying said current flow.

9. A nuclear fuel control rod for a nuclear reactor employing a self-regulating, mechanically passive control system including a main reactor section having core and reflector means with a portion of said rod fixedly positioned within said core means and a portion extending exteriorly thereof, with means for modifying the temperature of said exterior portion, said inner portion of said rod comprising an alloy of hydride material and nuclear fuel material and said outer portion of said rod comprising pure hydride material.

10. The device as claimed in claim 9 wherein said hydride material is a compound selected from the group consisting of yttrium hydride, zirconium hydride, silicon hydride, niobium hydride, calcium hydride, and barium hydride.

11. The device as claimed in claim 9 wherein said nuclear fuel material is an element selected from the group consisting of uranium, plutonium, and thorium.

12. A self-regulating, mechanically passive control system for a nuclear reactor having a main reactor section including core means carrying fuel material and reflector means, said system comprising: a control rod of hydride material, said control rod fixedly positioned with respect to said main reactor section with one end of said rod disposed therein in operative relation to said core means and the other end of said rod extending exteriorly thereof, and means for modifying the temperature of said rod end exterior of said core means to vary the hydrogen concentration within respective ends of said rod.

13. The apparatus as claimed in claim 12 wherein said hydride material is a compound selected from the group consisting of yttrium hydride, zirconium hydride, silicon hydride, niobium hydride, calcium hydride, and barium hydride.

14. The apparatus as claimed in claim 12 wherein said means for modifying the temperature of one end of said rod comprises electrical heating means positioned in proximity to the end of said control rod exterior of said core, means for supplying electrical current to said heating element and means to control said current flow.

15. A device for controlling a nuclear reactor having a core zone comprising:
(a) a control rod of hydride material having a first end adapted to be positioned within said core zone; and
(b) means for controlling the temperature of the other end of said control rod independently from its environment and said first end to effect a temperature differential between said ends of said control rod, whereby the hydrogen concentration within said respective ends is dependent upon said temperature differential.

16. The device of claim 15 wherein reactor fuel is incorporated in said first end of said control rod.

17. A device for controlling a nuclear reactor having a core comprising:
(a) a member of hydride material having a first section positioned in operative relationship with the reactor core; and
(b) means for controlling the temperature of a second section of said member independently from its environment and said first section whereby a differential in hydrogen concentration is effected between said sections dependent upon the temperature differential between said sections.

18. A device of claim 17 wherein reactor fuel is incorporated in said first section of said member.

19. A device for controlling a nuclear reactor having a core zone comprising:
(a) a member of hydride material having a first section positioned within said core zone;
(b) first means for initially increasing the temperature of a second section of said member relative to said first section whereby hydrogen diffuses from said second section to said first section to initiate operation of said reactor; and
(c) second means for subsequently varying said temperature differential as a function of changes in the temperature of the core of said reactor.

20. A device for controlling a nuclear reactor having a core zone comprising:
(a) a member of hydride material having a first section positioned in said core zone; and
(b) electrical heating means operable with a second section of said member to increase the temperature of said second section with respect to the temperature of said first section of said member, whereby hydrogen is caused to diffuse from said second section to said first section.

21. A device for controlling a nuclear reactor having a core zone comprising:
(a) a member of hydride material having a first section positioned within said core zone;
(b) first means for effecting an initial hydrogen concentration differential between the first and a second section of said member; and
(c) means for subsequently effecting diffusion of hydrogen reversibly between said first section and said second section as a function of subsequent changes in the temperature of said core.

22. A device for controlling a nuclear reactor having a core zone comprising:
(a) a hydride member positioned within said core zone, the hydrogen content of said member being insufficient to produce the critical state within said reactor;
(b) means for initially increasing the hydrogen content of said hydride member to effect a critical state within said reactor; and
(c) means for subsequently varying the hydrogen content of said hydride member as a function of the temperature of said core.

23. A device for controlling a nuclear reactor having a core zone comprising:
(a) hydride means having a first section adapted to be positioned within said core zone and a second section adapted to be positioned externally of said core zone, said first section communicating with said second section whereby hydrogen can flow therebetween; and
(b) means for controlling the temperature of said second section independently from its environment and said first section.

24. The device of claim 23 wherein reactor fuel is incorporated in said first section.

25. A device for controlling a nuclear reactor having a core zone comprising:
(a) hydride means having a first section adapted to be positioned within said core zone and a second section adapted to be positioned externally of said core zone, said first section communicating with said second section whereby hydrogen can flow therebetween; and
(b) a heating means operable with said second section to increase the temperature thereof with respect to the temperature of said first section, whereby hydrogen is caused to diffuse from said second section to said first section.

26. A device for controlling a nuclear reactor having a core zone comprising:
(a) a member of hydride material positioned within said core zone;
(b) a hydrogen source external to said core zone and communicating with said member; and
(c) means to induce reversible hydrogen flow between said source and said member.

References Cited

UNITED STATES PATENTS

| | | | |
|---|---|---|---|
| 2,952,600 | 9/1960 | Newson | 176—86 |
| 2,976,227 | 3/1961 | Wheeler | 176—42 |
| 2,998,367 | 8/1961 | Untermyer | 176—42 |
| 3,164,525 | 1/1965 | Wetch et al. | 176—42 |
| 3,218,236 | 11/1965 | Tollet | 176—84 |
| 3,285,822 | 11/1966 | Ackroyd | 176—42 |

FOREIGN PATENTS

| | | |
|---|---|---|
| 1,355,945 | 2/1964 | France. |
| 913,168 | 12/1960 | Great Britain. |

OTHER REFERENCES

Nucleonics, vol. 14, No. 11, November 1956, pages 146–153.

L. DEWAYNE RUTLEDGE, *Primary Examiner.*